US008622685B2

(12) United States Patent
Van Schijndel et al.

(10) Patent No.: US 8,622,685 B2
(45) Date of Patent: Jan. 7, 2014

(54) APPARATUS AND METHOD FOR STACKING OBJECTS

(75) Inventors: Marcel Van Schijndel, Groenlo (NL); Bart Laurens Te Braak, Groenlo (NL)

(73) Assignee: RSW IP BV, Groenlo (NL)

( * ) Notice: Subject to any disclaimer, the term of this patent is extended or adjusted under 35 U.S.C. 154(b) by 0 days.

(21) Appl. No.: 13/092,385

(22) Filed: Apr. 22, 2011

(65) Prior Publication Data

US 2012/0070263 A1 Mar. 22, 2012

Related U.S. Application Data

(63) Continuation of application No. PCT/NL2009/050641, filed on Oct. 23, 2009.

(30) Foreign Application Priority Data

Oct. 23, 2008 (NL) .................................. 2002131

(51) Int. Cl.
*B65G 57/26* (2006.01)
*B65G 57/22* (2006.01)

(52) U.S. Cl.
USPC ............... 414/793.5; 414/622; 414/792.9; 414/902; 414/789.9; 414/799; 294/67.33

(58) Field of Classification Search
USPC ............ 198/578; 271/191; 294/119.1, 67.33; 414/349, 622, 623, 662, 751.1, 791.6, 414/793.4, 793.5, 794.2, 794.4, 795.3, 799, 414/902, 927, 930, 497, 503, 671
See application file for complete search history.

(56) References Cited

U.S. PATENT DOCUMENTS

| 2,985,328 | A | * | 5/1961 | Kingsbury ............. 414/667 |
| 3,596,776 | A | * | 8/1971 | Melin ............... 414/788 |
| 3,870,356 | A | * | 3/1975 | Meads ............. 294/81.5 |
| 4,073,394 | A | * | 2/1978 | Biaggini et al. ....... 414/722 |
| 4,533,290 | A | * | 8/1985 | Hackauf ............ 414/667 |
| 5,096,363 | A | * | 3/1992 | Weinert et al. ....... 414/667 |

(Continued)

FOREIGN PATENT DOCUMENTS

| DE | 4206038 A1 | * | 9/1993 |
| DE | 10356563 | | 6/2005 |

(Continued)

OTHER PUBLICATIONS

Written Opinion and International Search Report of the European Patent Office in counterpart foreign application No. PCT/NL2009/050641 filed Oct. 23, 2009.

*Primary Examiner* — Gregory Adams
(74) *Attorney, Agent, or Firm* — Steven M Koehler; Westman, Champlin & Koehler, P.A.

(57) ABSTRACT

Apparatus and method for stacking objects on a transport carrier. The apparatus is provided with a forming platform, a loading platform on which a transport carrier to be loaded, such as a pallet or a roller container, can be placed, and a gripper which is movable between the forming platform and the loading platform. The gripper comprises a support frame which is provided with at least one row of parallel forks, which forks comprise an upright to which a horizontal beam is attached at a distance beneath the support frame, wherein the beams can be moved backward and forward in their longitudinal direction, wherein each fork is individually adjustable vis-à-vis the support frame. The forks are independently adjustable vis-à-vis the support frame.

8 Claims, 11 Drawing Sheets

(56) References Cited

U.S. PATENT DOCUMENTS

| | | | | |
|---|---|---|---|---|
| 5,827,039 A | * | 10/1998 | Gammerler | 414/744.6 |
| 6,129,504 A | * | 10/2000 | Gammerler et al. | 414/802 |
| 6,871,893 B2 | * | 3/2005 | Langston et al. | 294/113 |
| 7,213,684 B2 | * | 5/2007 | Bruns et al. | 187/237 |
| RE39,997 E | * | 1/2008 | Parnes et al. | 414/544 |
| 7,628,575 B2 | * | 12/2009 | Gammerler et al. | 414/790.2 |
| 2004/0165980 A1 | * | 8/2004 | Huang et al. | 414/799 |
| 2008/0095604 A1 | * | 4/2008 | Jeon | 414/794.5 |
| 2008/0260513 A1 | * | 10/2008 | Lalesse et al. | 414/791.8 |

FOREIGN PATENT DOCUMENTS

| | | |
|---|---|---|
| EP | 0816272 | 1/1998 |
| EP | 1875888 A2 | 6/2007 |
| JP | 3223709 B2 | 10/1991 |
| JP | 08012012 A | 1/1996 |
| NL | 1025826 | 10/2005 |
| WO | WO 0168330 | 9/2001 |
| WO | WO 2006/065090 A1 | 6/2006 |
| WO | WO 2007/093774 A1 | 8/2007 |
| WO | WO 2009150684 | 12/2009 |

* cited by examiner

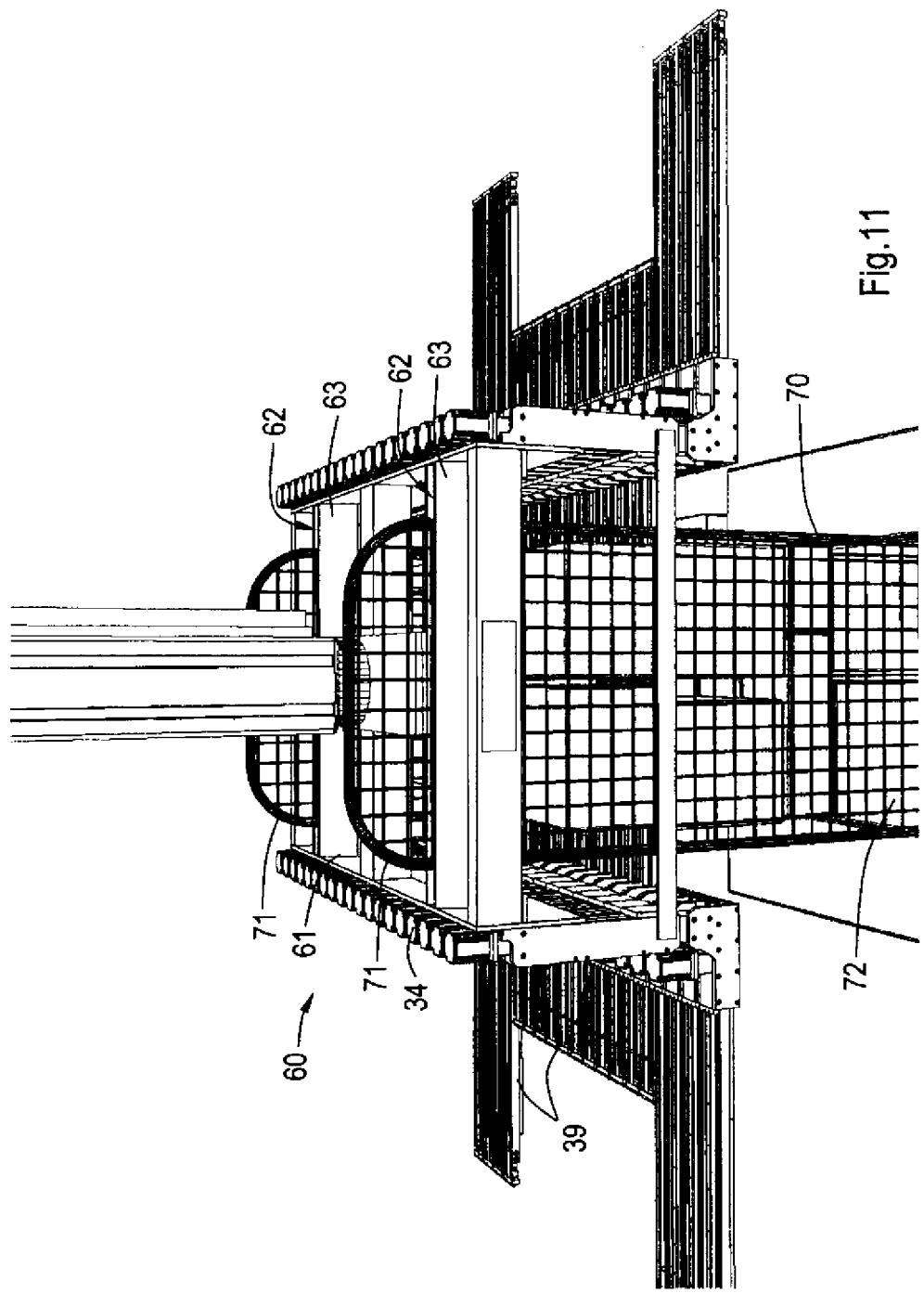

APPARATUS AND METHOD FOR STACKING OBJECTS

CROSS-REFERENCE TO RELATED APPLICATION

This application is a continuation application and claims priority under 35 U.S.C. 120 of international application PCT/NL2009/050641, filed Oct. 23, 2009 and published in English as WO/2010/047595 A1, the content of which is hereby incorporated by reference in its entirety.

BACKGROUND

The discussion below is merely provided for general background information and is not intended to be used as an aid in determining the scope of the claimed subject matter.

Aspects of the invention relate to an apparatus for stacking objects. Such stacking apparatuses are used for instance for stacking products on a carrier, such as a pallet or a roller container.

When stacking products of different dimensions or shapes, the stacking pattern should be optimised in such a way as will enable as many products as possible to be stacked in a stable manner.

NL 1025826 discloses a palletising apparatus which is used in particular for products having different dimensions. After a stacking layer has been formed, the layer is moved with the aid of a conveyor belt to a stacking area. During that moving the stacking pattern of the formed layer is maintained using means provided especially for the purpose.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An apparatus and method for stacking objects on a carrier is described. The apparatus is provided with a forming platform, a loading platform on which a transport carrier to be loaded can be placed, and a gripper which is movable between the forming platform and the loading platform, wherein the gripper comprises a support frame which is provided with at least one row of parallel forks, which forks comprise an upright to which a beam is attached at a distance beneath the support frame, wherein the beams can be moved backward and forward in their longitudinal direction, wherein each fork is individually adjustable vis-à-vis the support frame. The support frame can for instance be provided on two opposing sides with forks comprising an upright to which a longitudinally movable beam is attached at a distance beneath the support frame, wherein the beams can be moved backward and forward longitudinally in the direction of the opposing row of forks, wherein each fork is individually adjustable vis-à-vis the support frame.

In order to obtain a high flexibility, each upright can be provided with an individual drive unit for moving up and down. As a result of this, the various beams can be kept at different levels. When a layer to be stacked is placed on top of a lower, already stacked layer of products of different heights, then the products which are to be placed lower can be maintained in a lower position, so that the height of fall from the beam to the final position in the stack can be kept as small as possible for every product.

Each beam can also be provided with an individual drive unit for moving backward and forward in longitudinal direction. This makes it possible to retract a section of the beams earlier, or to keep a section of the beams retracted while moving the products to be stacked.

If both the beams and the uprights can be moved individually in a horizontal and a vertical direction, respectively, it becomes possible to stack a wide range of diverse products, which may for instance be of different dimensions, type and/or weight, on one and the same pallet and even in the same stacking layers. Also, compared with the stacking systems known so far, this offers more possible ways of positioning products on a carrier. When products of different heights are stacked, the top side of a stacked layer will form an uneven plane onto which a next layer of products has to be stacked. The products of the next layer to be stacked then have to be put down at different levels. Because of the mutually independent vertical adjustability of the forks, those products, despite the different levels at which they eventually end up, can still be stacked in one go as one layer. This can take place for instance in two steps. On the forming platform the products to be stacked are arranged at the same level. Next, they are lifted up by the gripper, which moves the layer of products to the loading platform. During this movement one or more of the forks can be vertically adjusted in such a way that the products being carried end up at the same relative height as in the stacking layer which is ultimately to be formed. Next, the gripper places the supplied layer on the layer or layers already stacked. The vertical adjustment of the forks in that case thus takes place on the way from the forming platform to the loading platform.

The vertical adjustment rate of the uprights can be for instance up to 1 m/sec, for instance up to 0.8 m/sec. The horizontal adjustment rate of the beams can be higher, for instance up to 2 m/sec, for instance 1.7 m/sec.

Depending on their calculated position in the layer to be stacked, the products to be stacked can be carried by the ends of two opposing beams. This will generally be the case when a product is to be positioned at the centre of a layer to be stacked. By not placing the opposing beams end to end, the ends of the beams can be placed side by side over a particular distance. This can result in as many products as possible being put in place in a single remove, thus saving time.

The gripper can for instance be capable of rotation about a vertical axis, for instance be capable of rotation through an angle of 180 degrees or 360 degrees or more. As a result of this, the ready carrier on which the stack to be formed is placed can be approached from several sides. This makes even more complicated stackings possible.

The gripper can for instance be disconnectable. This makes it possible for the gripper to be replaced by a gripper with a greater capacity when this is called for.

The gripper can be connected to a multi-axial removal apparatus, such as for instance a flexible arm robot.

The stacking apparatus can be modular, in which case the number or the capacity of the forming platforms, loading platforms, and grippers can be varied according to need. If so desired, the lay-out of the stacking apparatus may also be provided with one or more buffer zones.

The forming platform can be provided with parallel grooves of a width which corresponds easily with the width of the beams. As a result of this, the beams can be slid underneath the products to be stacked in order to then be lifted up when the gripper is moved upward.

The beam can be provided with a strap running longitudinally around the beam across the beam's top side and underside, which strap is connected to the upright by two ends. The products to be moved in that case rest on the strap around the beam. When the beam is retracted, the strap stays in place, but is gradually rolled out from under the product. As a result of this, the product does not have to be slid off the beam. This enables more precise positioning of the product when it is stacked. In order to guide the strap properly around the beam, the beam can be provided on the two crosscut sides with a roller guide along which the strap is guided. In order to optimise the grip on the product, the strap can be made of a non-slipping material, such as rubber nitrile (NBR) elastomer, optionally on a core of a carrier strap material such as a polyamide.

If so desired, the gripper may be provided with a number of vacuum heads which can move up and down. With these the products can be positioned more precisely still during the stacking and the product can be supported during the fall from the beam to the final position in the stack.

The apparatus can be combined with a pre-sorting unit and/or a preferably automated order picking system. This makes it possible to calculate the optimal stacking structure for a particular order already in advance and to have the products supplied in the correct sequence.

With the aid of one, two or more positioning arms, the supplied products can be put or slid, for instance from a supply strap, onto the forming table in the correct position and in the proper place and, optionally, be turned.

After a layer has been stacked, the layer can be compressed in order to achieve the desired compacting. The compressing can take place on all four sides of the layer. In order to increase the stability of the stack, a strap made for instance of plastic can be wound around one or more of the stacked layers—for instance around every second or third layer. Alternatively, after the stacking the complete stack formed on the carrier can be wrapped, for instance with a foil, before the carrier with the stack is dispatched.

The stacking apparatus makes it possible for products of very diverse dimensions to be stacked. Small products, say of 10 cm high or wide, as well as large products, say as large as the pallet itself, can be stacked. The stacking of flexible products, such as clothing, can also be performed in an efficient manner. This can be done for instance by positioning products with solid packaging around the periphery of the carrier, in which case the flexible products can then be positioned in the space enclosed by the solid packages.

BRIEF DESCRIPTION OF THE DRAWINGS

Aspects of the invention will be further elucidated with reference to the drawing. In the drawing:

FIG. 11 shows a gripper head which is particularly suitable for stacking on roller containers.

DETAILED DESCRIPTION OF THE ILLUSTRATIVE EMBODIMENTS

Figure 1:
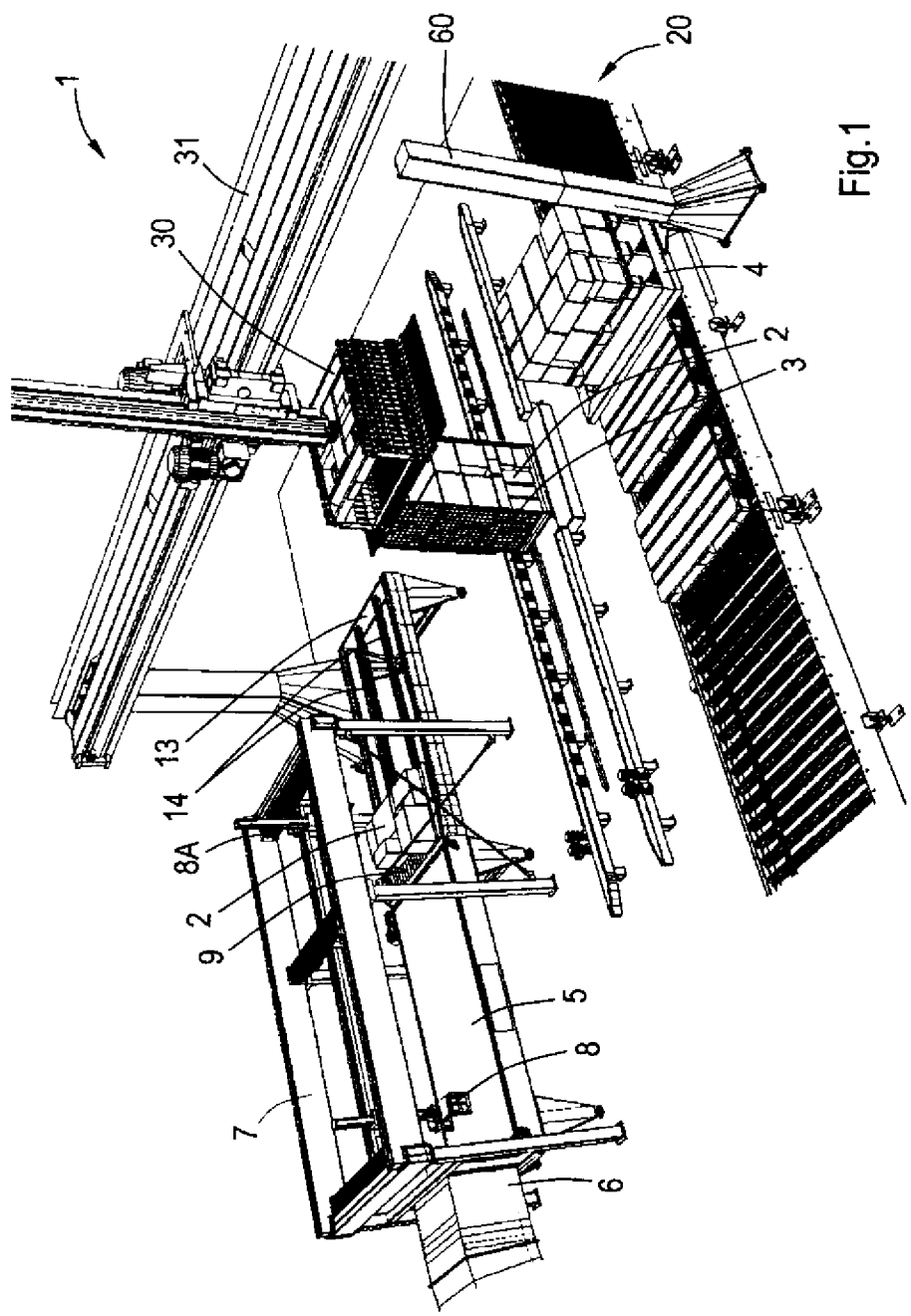
FIG. 1 shows a stacking apparatus according to the invention.
Figure 2:
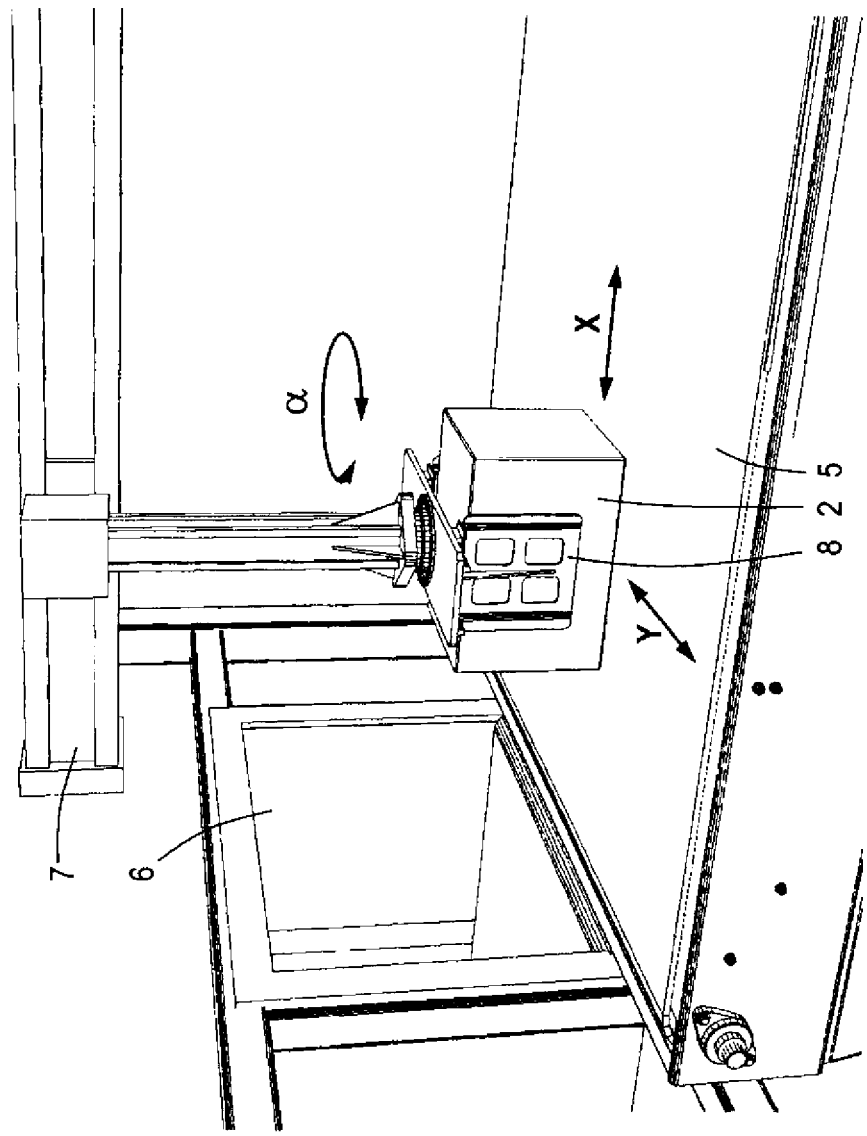
FIG. 2 shows the positioning arm of the stacking apparatus according to FIG. 1.

FIG. 1 shows an apparatus 1 for stacking products 2 on a roller container 3 or a pallet 4. The products 2 can have different shapes and dimensions. The apparatus 1 comprises a supply belt 5 for the supply of the products to be stacked 2. The products 2 are supplied with the aid of a pre-sorting unit by way of a supply pipe 6 in a sequence which makes it possible to achieve optimal stable stacking. The supply belt 5 is disposed in a frame 7, in which a positioning arm 8, which is shown in greater detail in FIG. 2, is suspended. The positioning arm 8 can be moved in a direction parallel with the longitudinal direction X of the supply belt 5 as well as in a direction Y perpendicular thereto and can in addition be rotated in a direction a about an axis perpendicular to the supply belt 5. As a result of this, the positioning arm 8 is capable of picking up products 2 supplied from the supply pipe 6 and of moving and, if necessary, turning them. The thus positioned products 2 are conveyed onwards by the supply belt 5 and moved to a forming table 9, where they are put in the desired position by a second positioning arm 8A. The products 2 have been positioned such by the positioning arm 8 as to form a layer to be stacked on the forming table 9.

Figure 3:
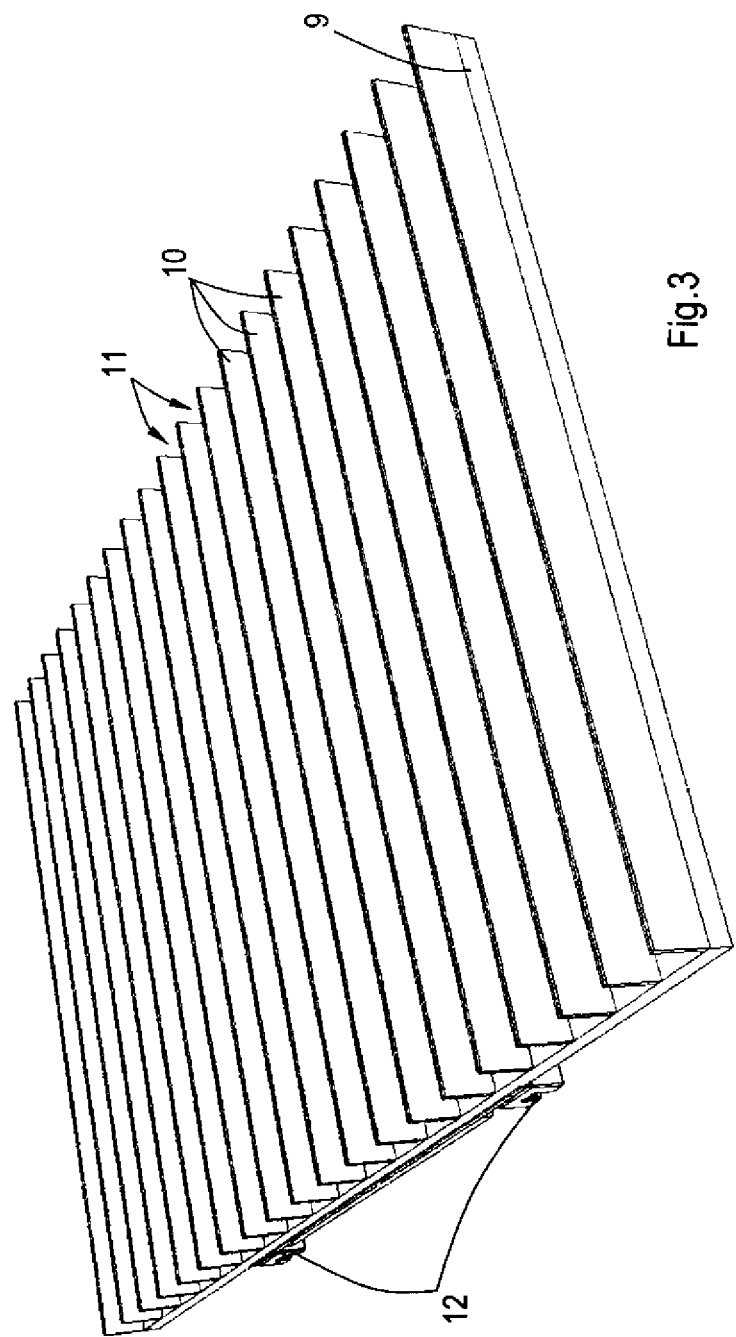
FIG. 3 shows the forming table of the stacking apparatus according to FIG. 1.

FIG. 3 shows the forming table 9 in detail. At the top side, the forming table 9 is provided with a number of parallel evenly spaced ribs 10, which bound continuous grooves 11 of equal width. At the underside the forming table 9 is provided with guide profiles 12 having a U-shaped cross-section. The guide profiles 12 are parallel with the grooves 11.

As shown in FIG. 1, the forming table 9 is placed on a support frame 13 with two guide rails 14 extending in the longitudinal direction of the frame, which guide rails have been mated with the guide profiles 12 on the underside of the forming table 9. As a result of this, the table 9 can be moved forward and backward between a forming position where the forming table 9 connects to the supply belt 5—as shown in FIG. 1—and a discharge position at the other end of the support frame 13.

Figure 4:
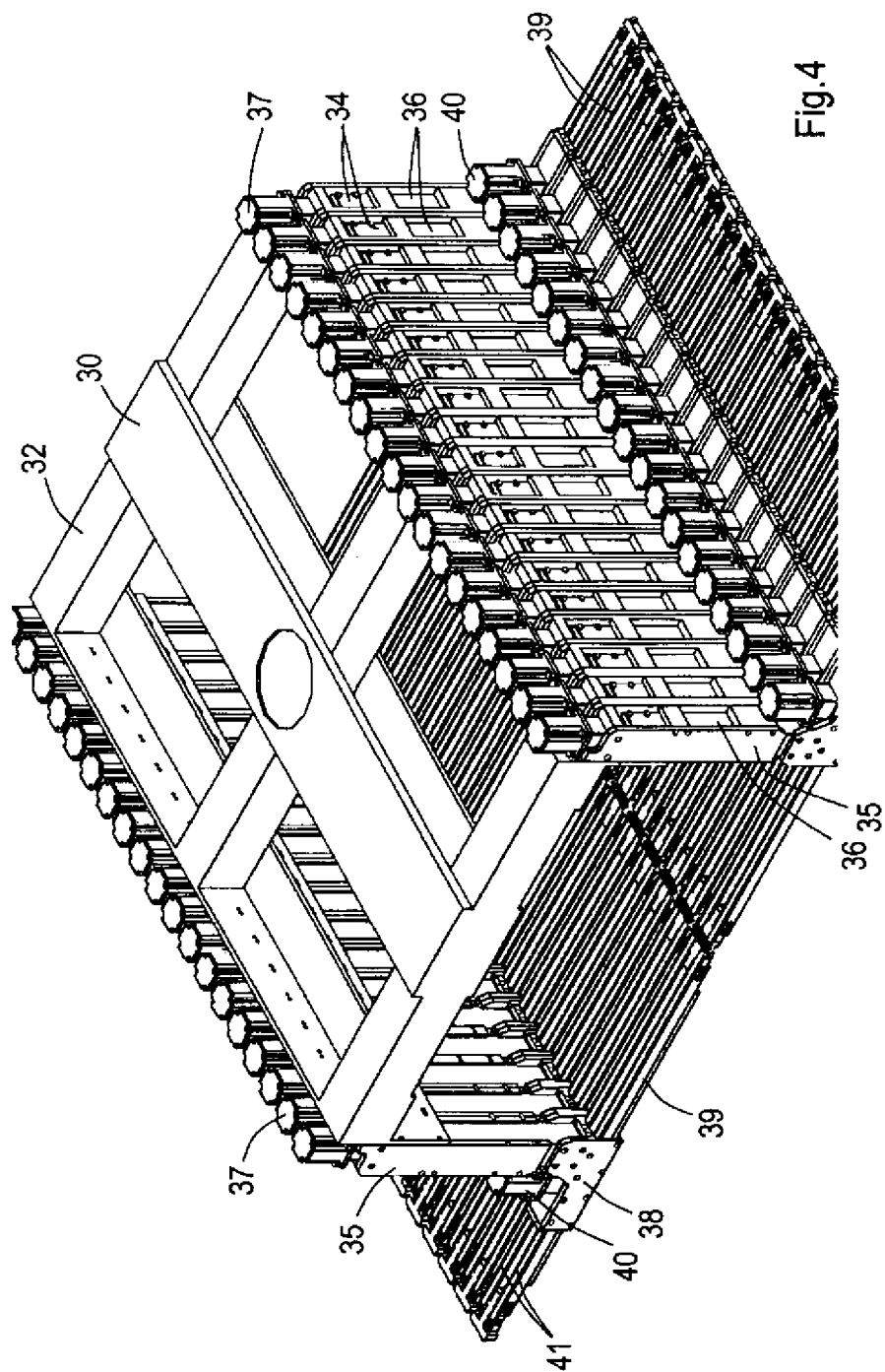
FIG. 4 shows the gripper head of the stacking apparatus according to FIG. 1.
Figure 5:
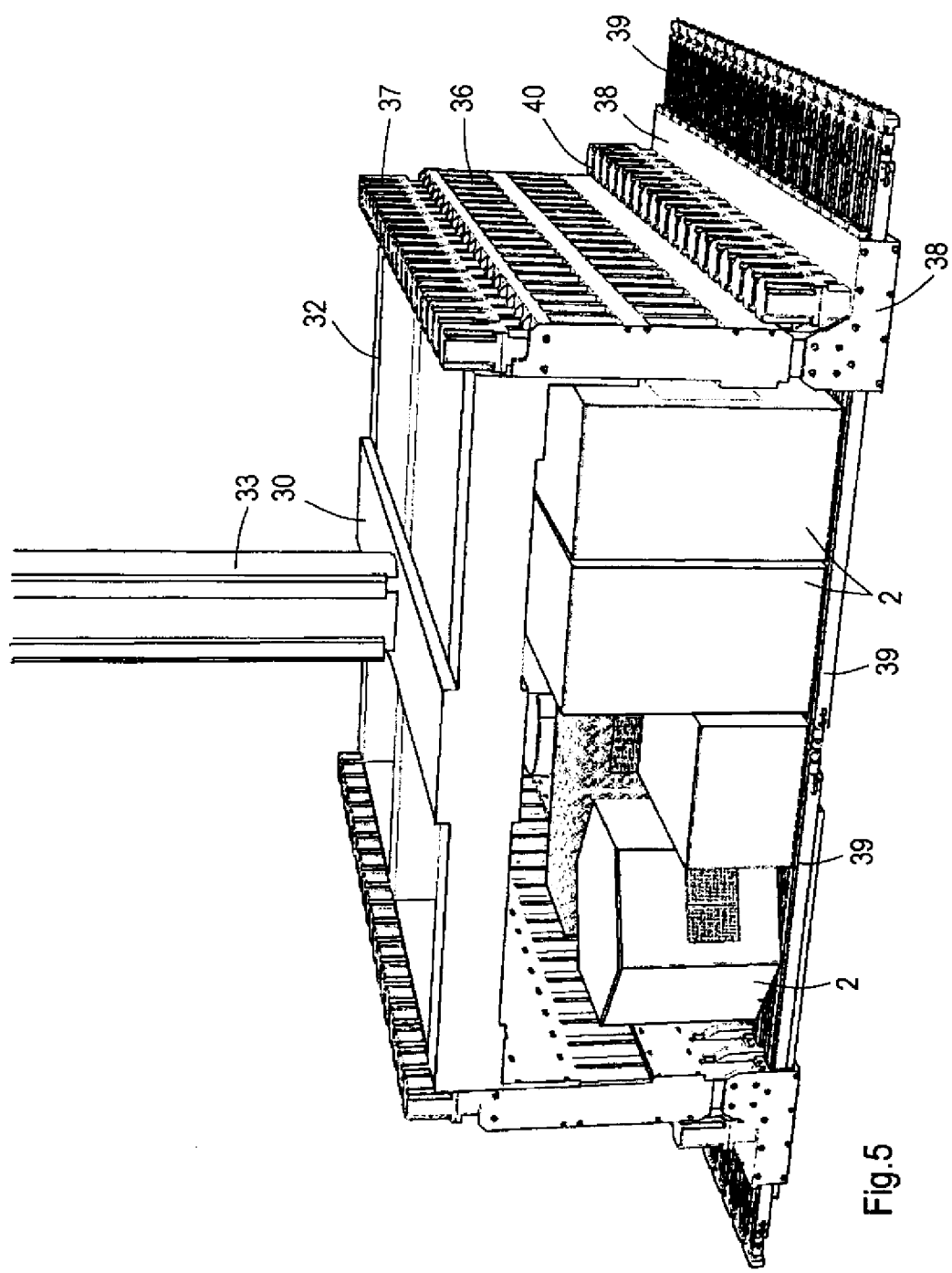
FIG. 5 shows the gripper head of FIG. 4 during the carrying of a stacked layer.
Figure 6:
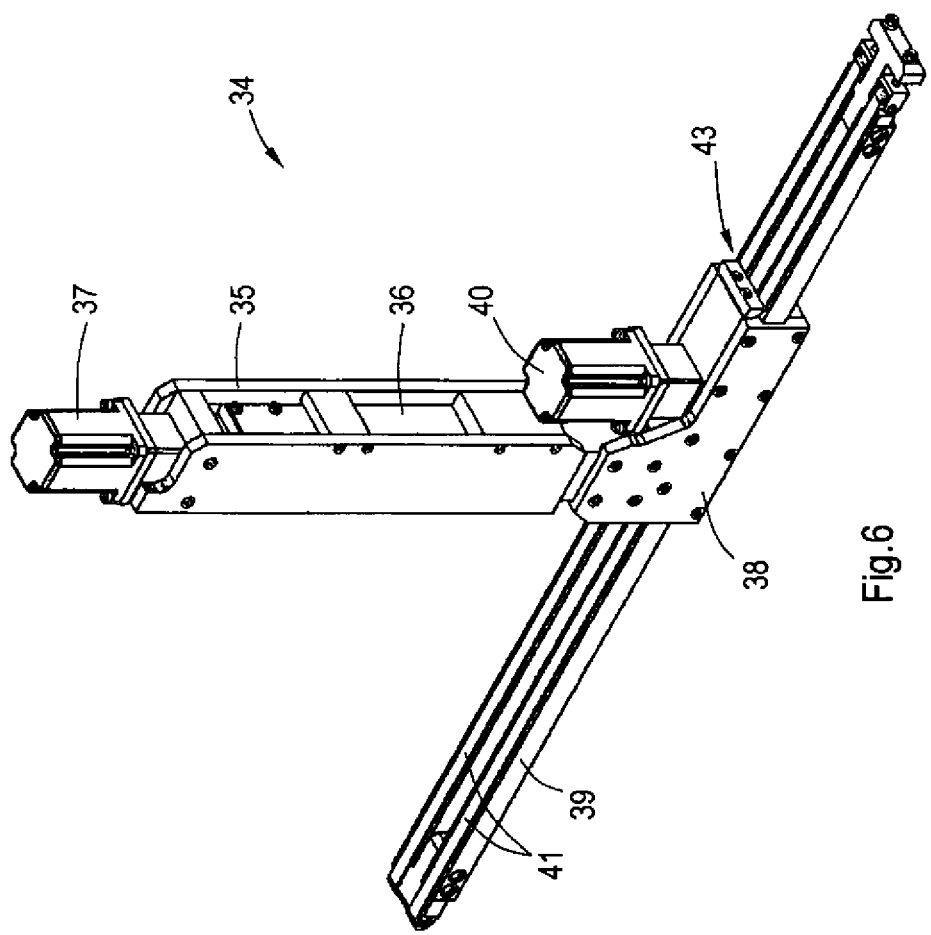
FIG. 6 shows a fork of the gripper head according to FIG. 4.

The apparatus 1 additionally comprises a loading platform or stacking area 20 and a gripper head 30. The gripper head 30 can be moved by way of a guide frame 31 between a position above the stacking area 20 and a position above the forming table 9 when this is situated in the discharge position at the end of the support frame 13. In both uttermost positions the gripper head 30 can be moved up and down. The gripper head 30 is shown in detail in FIG. 4. FIG. 5 shows the same gripper head 30 in the course of carrying a formed layer of products 2. The gripper head 30 comprises a rectangular support frame 32 suspended from the end of a vertical bearing girder 33. The support frame 32 is provided on two opposing sides with a row of forks 34. FIG. 6 shows an individual fork 34. Each fork 34 comprises a vertical profile 35, into which a telescopically extendable upright 36 is incorporated which can be moved up and down vis-à-vis the vertical profile 35 with the aid of a drive unit 37 and a spindle gear (not shown). On the underside of each extendable upright 36 a shoe 38 is attached, into which a beam 39 is slidably incorporated. All beams 39 are parallel with each other and can be moved backward and forward longitudinally vis-à-vis the shoe 38 by way of a toothed gear rack (not shown) driven by a motor 40. All round each beam 39 there are two parallel non-slipping straps 41. The non-slipping straps 41 go across the top side and the underside of the beam 39 by way of the crosscut sides of the beam 39. Each non-slipping strap 41 has two ends 42, 43, which are attached on either side of the shoe 38.

Figure 7:
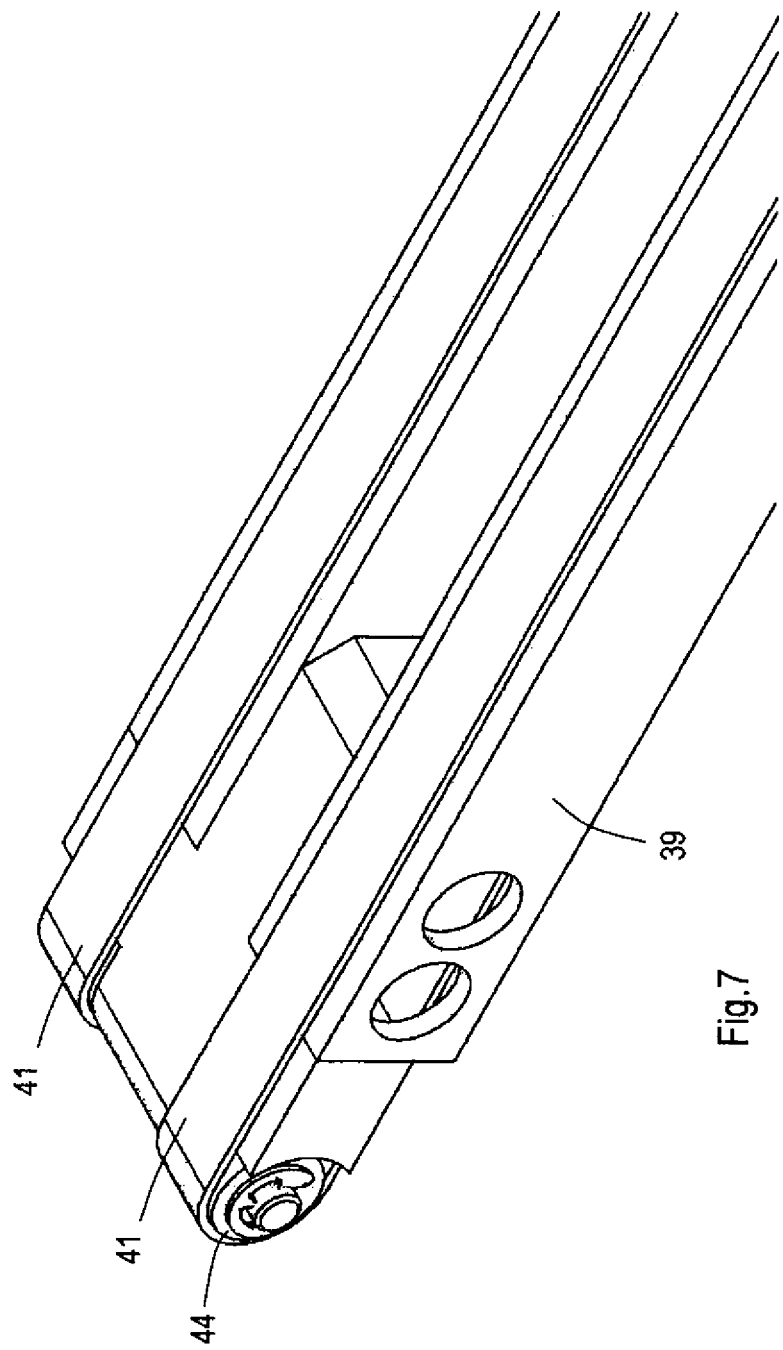
FIG. 7 shows in detail an end of a fork according to FIG. 6.

As is shown in detail by FIG. 7, the beam 39 is provided on either end with a bend pulley 44, the axis of which is at right angles to the longitudinal direction of the beam 39. The non-slipping straps 41 run round about the bend pulley 44. When the beam 39 is moved backward and forward, the non-slipping straps 41 remain in place. In this way it is brought about that any products 2 which are positioned on the beam 39 do not have to be slid off the beam 39 when the beam 39 is retracted. On retracting the beam 39 the straps 41 are rolled out from under the product 2 and the product 2 remains in the same place.

In the embodiment of FIG. 7 the non-slipping strap 41 consists of two parallel straps. If so desired, however, the strap 41 may consist of a single strap, or the beam 39 may be divided into two parallel, individually movable beams.

The uprights 36 and the beams 39 are individually movable. This enables a segmented driving of the gripper head 30.

When a layer of products 2 has been formed on the forming table 9, the gripper head 30 can be moved to the forming table 9, in which process all beams 39 are as fully retracted as possible. The gripper head 30 can then be positioned over the formed layer. When the beams 39 are in the same straight line as the grooves 11 in the forming table 9, the beams 39 can be moved towards each other again by way of the grooves 11, into which they can be incorporated with ample clearance. The gripper head 30 can then lift the formed layer, after which the gripper head 30 is moved by way of the guide frame 31 to the stacking area 20. This situation is depicted schematically in FIG. 8. After that, the formed layer of products 2 is lowered until it comes to rest on a pallet 50 standing in readiness, optionally on lower layers of products 2 which have been stacked on the pallet 50 earlier. The non-slipping strap 41 does not move with the beams 39 as they are retracted, so that the products 2 which are on the beam 39 do not have to be slid off the beam 39. The products 2 remain in place while the non-slipping straps 41 are rolled out from under the products by the beam 39. The products 2 are thus posited on the underlying layer.

The uprights 36 can be controlled independently. As a result of this, the beams 39 may, if so desired, be kept at different levels, so that some products 2 can be kept lower than other products 2, as is shown for instance in FIG. 8. If one or more layers of products 2 have already been stacked on the pallet 50, then the product 2 which is stacked onto a less high product 2 can be kept lower than products 2 which are stacked onto a higher product 2. Thus the height of fall is kept as low as possible for all products 2.

Figure 8:
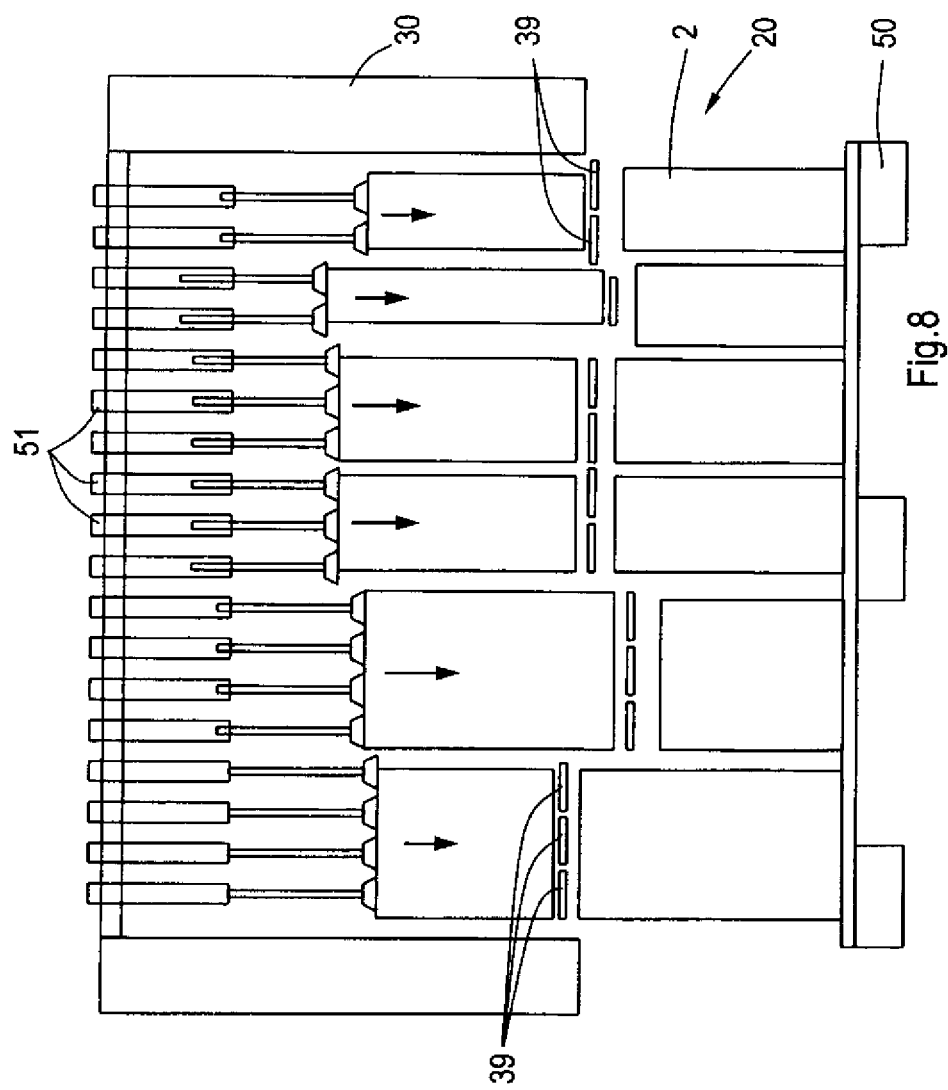
FIG. 8 shows in schematic elevation the gripper head of the apparatus according to FIG. 1 during stacking on a pallet.

If so desired, means may be used to support the products during the stacking. These may for instance be vacuum heads 51, as shown in FIG. 8, operably coupled to a vacuum source, not shown.

Figure 9:
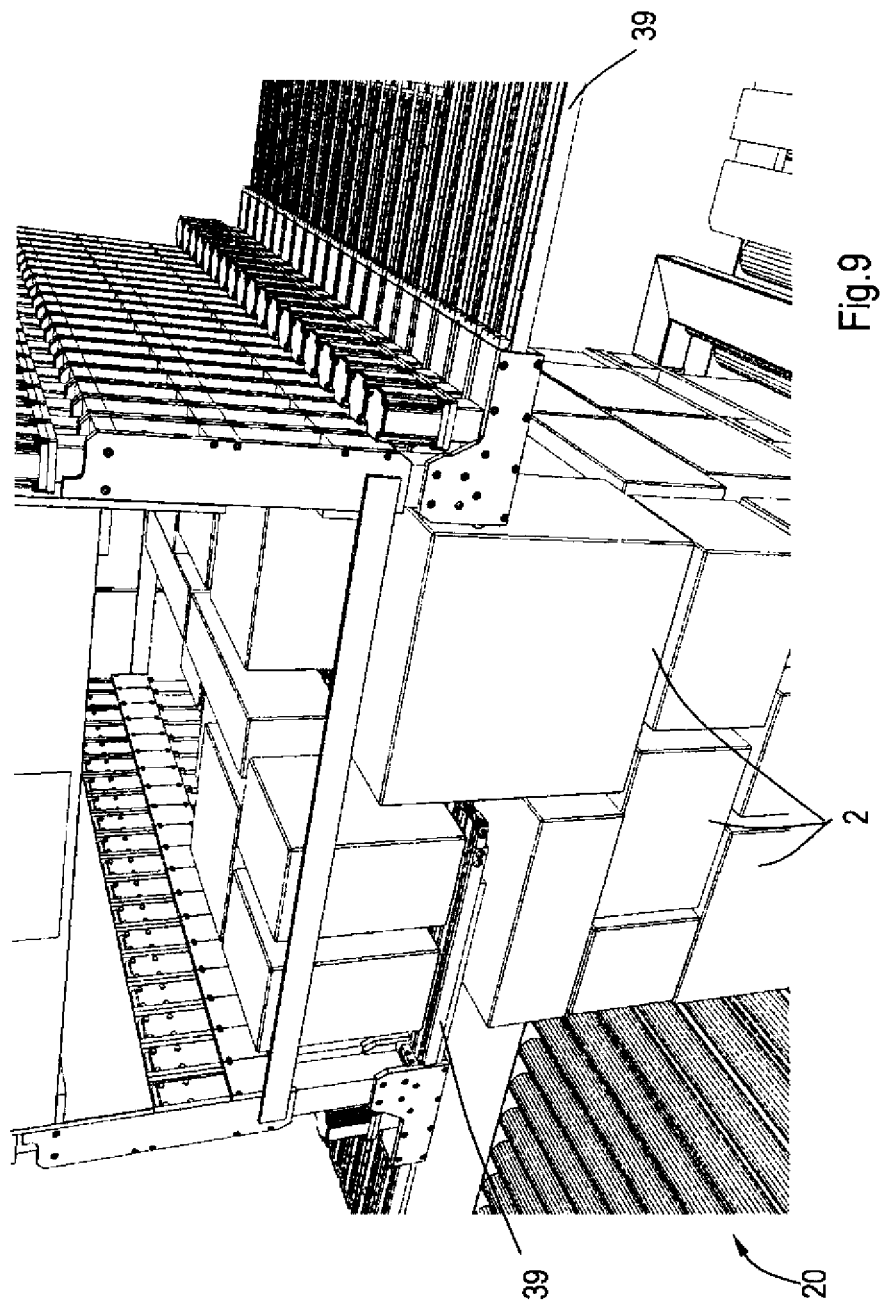
FIG. 9 shows in perspective view the gripper head of FIG. 4 during stacking on a pallet.

Alternatively, the beams 39 can be retracted independently. If the pallet 50 already holds a previously stacked layer of products 2 of unequal height, then the beams 39 on which there are products 2 which are placed on high products 2 can be retracted first. After that, the gripper head 30 can be lowered and a next product 2 can be posited on a product 2 on a slightly lower level. Alternatively, a beam 39 can be retracted in stages, in which case the product 2 is first placed on the end of the beam 39, after which, if necessary, the beam 39 can be lowered in order to then be retracted further for a next product 2 to be put in place. Alternatively, the gripper head 30 can be used to move just part of a layer. The beams 39 on which there are no products 2 then in that case can be kept in the retracted position, as is shown in FIG. 9. Where the beams 39 have been retracted, the gripper head 30 can be lowered over upright products 2 of a previously stacked layer in order to put new products 2 to be stacked in place on the remainder of the previously stacked layer.

Figure 10:
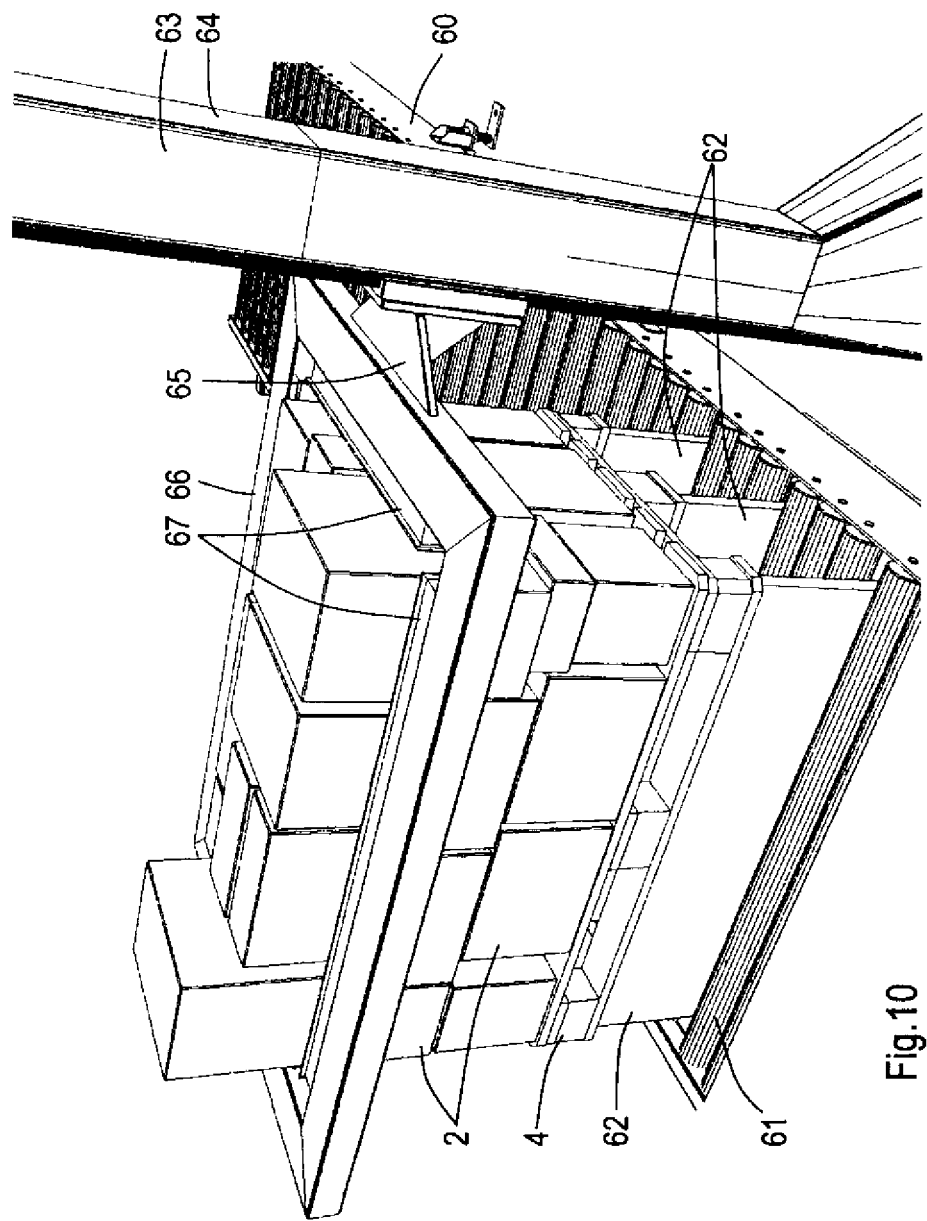
FIG. 10 shows the compacting station of the apparatus of FIG. 1.

The stacking area 20 consists of a roller conveyor 60. Between the rollers 61 of the roller conveyor 60 there are three partitions 62 which project above the roller conveyor 60 during the stacking, as is shown in greater detail in FIG. 10. On the partitions 62 is placed the pallet 4 onto which the products 2 are stacked. Next to the partitions 62 a compacting station 63 is placed. The compacting station 63 comprises an upright 64 on which a supporting arm adjustable in height is mounted. On the supporting arm 65 a horizontal frame work 66 is mounted, which is dimensioned and positioned such that it can be lowered over a stack of products 2 on a pallet 4 on the partitions 62. On each of the four inner sides of the frame work 66 there is a pressure member 67. By moving the pressure members 67 inward, the products 2 in a stacked layer are moved toward each other and the stack is compacted until the desired degree of compacting is obtained. In order to increase the stability of the stack, a plastic clamping strap can be wound around every second or third layer. After a whole stack of products 2 has been stacked and compacted, the partitions 62 are lowered until the pallet 4 stands on the rollers 61 of the roller conveyor 60, while the frame work 66 is raised. The pallet 4 with the stack of products 2 can then be removed by way of the roller conveyor 60.

After the stacking the complete stack on the carrier is wrapped in a foil in a separate station, before the carrier with the stack is dispatched.

FIG. 11 shows a gripper head 60 which is especially equipped for use with roller containers 70. The gripper head 60 to this end comprises a support frame 61, which is provided with two parallel rectangular grooves 62 between two plate-shaped crossbeams 63, through which the raised sides 71 of the roller containers 70 can be slid. The crossbeams 63 are slightly closer together at the top side than at the underside, enabling the gripper head 60 to be lowered more easily over the sides 71 of the roller container 70. The beams 39 of the outermost forks 34 remain in the retracted position to keep them at a distance from the sides 71 of the roller container 70. The supporting head 60 can thus be lowered over the sides 71 in order to put a layer to be stacked on the bottom 72 of the roller container 70, or on a layer previously put in place.

It should be understood movement of each of the components described above can be controlled by a suitable controller operably coupled to control a drive unit for the component (s). Some of such drive units are discussed above by way of example; however generally such drive units include, but are not limited to, linear actuators, for example, linear electric motors, hydraulic or pneumatic piston/cylinder actuators configured to move each of the components relative to another component. Other forms of drive units include rotary electric, hydraulic or pneumatic motors with drive mechanisms such as screws and nuts, pulleys and belts/chains, gears, gear racks, levers, etc. arranged in any suitable manner, well known to those skilled in the art, to provide the desired rotary or linear movement of one component relative to another component.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A method of stacking a first layer of two or more objects from a collection platform having parallel grooves onto at least two objects forming a second layer of objects wherein upper surfaces of said at least two objects of the second layer have two different heights, the method comprising:

locating a gripper proximate the collection platform, the gripper having a support frame which is provided with a row of forks, each fork comprising an upright joined to the support frame and a horizontal beam joined to the upright a distance beneath the support frame, wherein each beam comprises a drive unit for individually moving the beam backward and forward in a longitudinal direction thereof, and wherein each upright comprises a drive unit for individually moving the upright in a vertical direction during operation, and wherein each fork is individually adjustable relative to the support frame;

moving at least some of the beams longitudinally, wherein each beam is moved into a groove using the drive unit for the beam, wherein a vertical distance of each of said at least some of the beams to the support frame is substantially the same;

displacing the gripper upwardly so as to lift and carry the first layer of the objects with said at least some beams, wherein a beam carries two objects of the first layer of objects; and operating individual drive units of the uprights while the first layer of objects are being carried so as to adjust a relative vertical distance of each of the corresponding beams relative to the support frame so as to adjust relative heights of lower surfaces of the first layer of objects to correspond to the two different heights of the upper surfaces of said at least two objects of the second layer; and positioning the objects of the first layer onto the second layer of objects, wherein positioning comprises retracting the beam in consecutive steps to position each object of said two objects at different respective heights on the second layer of objects.

2. The method of claim 1 wherein only part of the beams carry objects of the first layer while the other beams remain in the retracted position during carrying of the first layer of objects.

3. A method of stacking a first layer of two or more objects from a collection platform having parallel grooves onto at least two objects forming a second layer of objects wherein upper surfaces of said at least two objects of the second layer have two different heights, the method comprising:

locating a gripper proximate the collection platform, the gripper having a support frame which is provided with a row of forks, each fork comprising an upright joined to the support frame and a horizontal beam joined to the upright a distance beneath the support frame, wherein each beam comprises a drive unit for individually moving the beam backward and forward in a longitudinal direction thereof, and wherein each upright comprises a drive unit for individually moving the upright in a vertical direction during operation, and wherein each fork is individually adjustable relative to the support frame:

moving at least some of the beams longitudinally, wherein each beam is moved into a groove using the drive unit for the beam, wherein a vertical distance of each of said at least some of the beams to the support frame is substantially the same;

displacing, the gripper upwardly so as to lift and carry the first layer of the objects with said at least some beams; and operating individual drive units of the uprights while the first layer of objects are being carried so as to adjust a relative vertical distance of each of the corresponding beams relative to the support frame so as to adjust relative heights of lower surfaces of the first layer of objects to correspond to the two different heights of the upper surfaces of said at least two objects of the second layer; and positioning the objects of the first layer onto the second layer of objects, wherein positioning comprises:

retracting a first group of beams to place one or more objects at a first height on the second layer of objects followed by lowering the gripper until a second group of beams carrying one or more objects are at a second height; and retracting the second group of beams to place the one or more objects carried by the second group of beams on the second layer of objects at the second height.

4. A method of stacking a first layer of two or more objects from a collection platform having parallel grooves onto at least two objects forming a second layer of objects wherein upper surfaces of said at least two objects of the second layer have two different heights, the method comprising:

locating a gripper proximate the collection platform, the gripper having a support frame which is provided with a row of forks, each fork comprising an upright joined to the support frame and a horizontal beam joined to the upright a distance beneath the support frame, wherein each beam comprises a drive unit for individually moving the beam backward and forward in a longitudinal direction thereof, and wherein each upright comprises a drive unit for individually moving the upright in a vertical direction during operation, and wherein each fork is individually adjustable relative to the support frame;

moving at least some of the beams longitudinally, wherein each beam is moved into a groove using the drive unit for the beam, wherein a vertical distance of each of said at least some of the beams to the support frame is substantially the same;

displacing the gripper upwardly so as to lift and carry the first layer of the objects with said at least some beams; and operating individual drive units of the uprights while the first layer of objects are being carried so as to adjust a relative vertical distance of each of the corresponding beams relative to the support frame so as to adjust relative heights of lower surfaces of the first layer of objects to correspond to the two different heights of the upper surfaces of said at least two Objects of the second layer; and positioning the objects of the first layer onto the second layer of objects, wherein positioning the objects of the first layer onto the second layer of objects comprises retracting a first group of the beams to place a first object at a first height on the second layer, while also retracting a second group of the beams to place a second object at a second height on the second layer, the first group of beams being at a first vertical distance from the support frame and the second group of beams being at a second vertical distance from the support frame, the first vertical distance being different than the second vertical distance.

5. A method of gripping a first plurality of objects from a collection platform having parallel grooves and carrying and stacking the first plurality of objects upon a second plurality of objects, the second plurality of objects having upper surfaces at two different heights, the method comprising:
  locating a gripper proximate the collection platform, the gripper having a support frame which is provided with at least one row of forks, each fork comprising an upright joined to the support frame and a horizontal beam joined to the upright a distance beneath the support frame, wherein each beam comprises a drive unit for individually moving the beam backward and forward in a longitudinal direction thereof, and wherein each upright comprises a drive unit for individually moving the upright in a vertical direction during operation, and wherein each fork is individually adjustable relative to the support frame;
  moving at least some of the beams longitudinally, wherein each beam moved is moved into a groove using the drive unit for the beam, wherein a vertical distance of each of said at least some of the beams to the support frame is substantially the same;
  displacing the gripper upwardly to lift and carry the first plurality of objects with at least some beams, wherein a beam carries two or more objects of the first plurality of objects; and
  stacking the first plurality of objects as a layer upon the second plurality of objects, wherein stacking comprises before placing any of the first plurality of objects upon the second plurality of objects, operating the individual drive units of the uprights while the first plurality of objects are being carried to the second plurality of objects to adjust a relative vertical distance of each of the corresponding beams relative to the support frame to adjust relative heights of lower surfaces of the first plurality of objects to correspond to the two different heights of the upper surfaces of the second plurality of objects, and wherein stacking comprises retracting the beam in consecutive steps to position each object of said two or more objects at different respective heights on the second plurality of objects.

6. The method of claim 5 wherein only part of the beams carry objects of the first plurality of objects while the other beams remain in the retracted position during carrying of the first plurality of objects.

7. A method of gripping a first plurality of objects from a collection platform having parallel grooves and carrying and stacking the first plurality of objects upon a second plurality of objects, the second plurality of objects having upper surfaces at two different heights, the method comprising:
  locating a gripper proximate the collection platform, the gripper having a support frame which is provided with at least one row of forks, each fork comprising an upright joined to the support frame and a horizontal beam joined to the upright a distance beneath the support frame, wherein each beam comprises a drive unit for individually moving the beam backward and forward in a longitudinal direction thereof, and wherein each upright comprises a drive unit for individually moving the upright in a vertical direction during operation, and wherein each fork is individually adjustable relative to the support frame;
  moving at least some of the beams longitudinally, wherein each beam moved is moved into a groove using the drive unit for the beam, wherein a vertical distance of each of said at least some of the beams to the support frame is substantially the same;
  displacing the gripper upwardly to lift and carry the first plurality of objects with at least some beams, wherein at least one of the beams carries two or more objects of the first plurality of objects; and
  stacking the first plurality of objects as a layer upon the second plurality of objects, wherein stacking comprises before placing any of the first plurality of objects upon the second plurality of objects, operating the individual drive units of the uprights while the first plurality of objects are being carried to the second plurality of objects to adjust a relative vertical distance of each of the corresponding beams relative to the support frame to adjust relative heights of lower surfaces of the first plurality of objects to correspond to the two different heights of the upper surfaces of the second plurality of objects, and wherein stacking comprises retracting the beam in consecutive steps to position each object of said two or more objects at different respective heights on the second plurality of objects, wherein stacking comprises:
    retracting a first beam to place a first object at a first height on the second plurality of objects followed by lowering the gripper until a second beam carrying a second object is at a second height; and
    retracting the second beam to place the second object carried by the second beam on the second plurality of objects at the second height.

8. A method of gripping a first plurality of objects from a collection platform having parallel grooves and carrying and stacking the first plurality of objects upon a second plurality of objects, the second plurality of objects having upper surfaces at two different heights, the method comprising:
  locating a gripper proximate the collection platform, the gripper having a support frame which is provided with at least one row of forks, each fork comprising an upright joined to the support frame and a horizontal beam joined to the upright a distance beneath the support frame, wherein each beam comprises a drive unit for individually moving the beam backward and forward in a longitudinal direction thereof, and wherein each upright comprises a drive unit for individually moving the upright in a vertical direction during operation, and wherein each fork is individually adjustable relative to the support frame;
  moving at least some of the beams longitudinally, wherein each beam moved is moved into a groove using the drive unit for the beam, wherein a vertical distance of each of said at least some of the beams to the support frame is substantially the same;
  displacing the gripper upwardly to lift and carry the first plurality of objects with at least some beams, wherein at least one of the beams carries two or more objects of the first plurality of objects; and
  stacking the first plurality of objects as a layer upon the second plurality of objects, wherein stacking comprises before placing any of the first plurality of objects upon the second plurality of objects, operating the individual drive units of the uprights while the first plurality of objects are being carried to the second plurality of objects to adjust a relative vertical distance of each of the corresponding beams relative to the support frame to adjust relative heights of lower surfaces of the first plurality of objects to correspond to the two different heights of the upper surfaces of the second plurality of objects, and wherein stacking comprises retracting the beam in consecutive steps to position each object of said two or more objects at different respective heights on the second plurality of objects, wherein stacking the first plurality of objects onto the second plurality of objects comprises retracting a first group the beams to place a first object at a first height on the second plurality of objects, while also retracting a second group of the beams to place a second object at a second height on the second plurality of objects, the first group of beams being at a first vertical distance from the support frame and the second group of beams being at a second vertical distance from the support frame, the first vertical distance being different than the second vertical distance.

* * * * *